(12) United States Patent
Miller et al.

(10) Patent No.: US 11,466,591 B2
(45) Date of Patent: Oct. 11, 2022

(54) REDUCED RADIAL CLEARANCE SEAL SYSTEM

(71) Applicant: Raytheon Technologies Corporation, Farmington, CT (US)

(72) Inventors: Jonathan Logan Miller, Belchertown, MA (US); Daniel B. Denis, Simsbury, CT (US); Shadd A. Bradshaw, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 145 days.

(21) Appl. No.: 16/869,972

(22) Filed: May 8, 2020

(65) Prior Publication Data
US 2021/0348523 A1 Nov. 11, 2021

(51) Int. Cl.
*F01D 25/18* (2006.01)
*F16J 15/34* (2006.01)

(52) U.S. Cl.
CPC ........ *F01D 25/183* (2013.01); *F16J 15/3496* (2013.01)

(58) Field of Classification Search
CPC .... F16J 15/00; F16J 15/16; F16J 15/50; F16J 15/52; F16J 15/34; F16J 15/3496; F01D 25/00; F01D 25/183; F01D 25/186
USPC ....................................................... 277/500
See application file for complete search history.

(56) References Cited

U.S. PATENT DOCUMENTS

| | | | |
|---|---|---|---|
| 7,648,143 B2 * | 1/2010 | Davis ....................... | F16J 15/30 277/349 |
| 8,657,573 B2 * | 2/2014 | Munson ................ | F16J 15/441 415/230 |
| 9,004,495 B2 * | 4/2015 | Vasagar ................ | F16J 15/442 277/585 |
| 9,309,975 B2 * | 4/2016 | Kostka .................... | F16J 15/443 |
| 9,359,912 B2 * | 6/2016 | Ullah .................... | F01D 11/003 |
| 9,638,326 B2 * | 5/2017 | Haynes ................. | F16J 15/441 |
| 10,520,096 B2 * | 12/2019 | Munson ................ | F16J 15/441 |
| 10,544,866 B2 * | 1/2020 | Fadgen ................... | F16J 15/32 |
| 2012/0177486 A1 | 7/2012 | Ullah et al. | |
| 2012/0261887 A1 | 10/2012 | Vasagar | |
| 2016/0032765 A1 | 2/2016 | Shuaib et al. | |
| 2016/0032771 A1 | 2/2016 | Vdoviak, Jr. et al. | |

FOREIGN PATENT DOCUMENTS

CN 105972216 A 9/2016

OTHER PUBLICATIONS

Special metals (Year: 2013).*
ECGA (Year: 2018).*
Burman, R.W.: "Molybdenum—a super superalloy", J. Metals., vol. 29, No. 12, Dec. 1, 1977, pp. 12-17, XP001266901.
EP Search Report dated Sep. 27, 2021, issued for corresponding European Patent Application No. 21173027.0.

\* cited by examiner

*Primary Examiner* — Nathan Cumar
(74) *Attorney, Agent, or Firm* — Bachman & LaPointe, P.C.

(57) ABSTRACT

A seal system for a gas turbine engine includes a seal runner manufactured of a Molybdenum alloy material that provides a first coefficient of thermal expansion and a seal ring manufactured of a graphitic material that provides a second coefficient of thermal expansion greater than the first coefficient of thermal expansion.

19 Claims, 3 Drawing Sheets

REDUCED RADIAL CLEARANCE SEAL SYSTEM

BACKGROUND

The present disclosure relates to a gas turbine engine and, more particularly, to a seal system therefor.

Certain sections of gas turbine engines may operate at high temperatures and pressures and some engine components may be sensitive thereto. Typically, seal systems are positioned at main shaft bearing compartments to minimize the high temperature and pressure air from flowing into sensitive areas and prevent the oil used for cooling and lubrication from escaping the compartment. Such seal systems may utilize carbon seals and labyrinth seals. Conventional seal systems utilize materials which have properties that may result in less favorable operating radial gaps/clearances or may also have strength or structural limitation.

Advanced gas turbine engines require higher performance seals which are higher in rubbing velocity while also meeting more aggressive cost, weight, size, environmental, and reliability metrics.

SUMMARY

A seal system for a gas turbine engine according to one disclosed non-limiting embodiment of the present disclosure includes a seal runner manufactured of a Molybdenum alloy material that provides a first coefficient of thermal expansion; and a seal ring manufactured of a graphitic material that provides a second coefficient of thermal expansion greater than the first coefficient of thermal expansion.

A further embodiment of any of the foregoing embodiments of the present disclosure includes that the seal ring is assembled to the seal runner to form a sealing interface that provides a clearance in both a hot operating condition and a cold operating condition.

A further embodiment of any of the foregoing embodiments of the present disclosure includes that the sealing interface defines a 200%-300% smaller effective sealing interface at the cold operating condition as compared to seal runner materials which have an equivalent tensile yield strength capability of 120,000-142,000 psi tensile yield strength.

A further embodiment of any of the foregoing embodiments of the present disclosure includes that the sealing interface at the hot operating condition is essentially zero.

A further embodiment of any of the foregoing embodiments of the present disclosure includes that the sealing interface at the hot operating condition is about 0.001 inches (0.0254 mm).

A further embodiment of any of the foregoing embodiments of the present disclosure includes that the seal runner is manufactured of a Titanium-Zirconium-Molybdenum (TZM) alloy.

A further embodiment of any of the foregoing embodiments of the present disclosure includes that the seal ring is manufactured of electrographitic carbon materials.

A further embodiment of any of the foregoing embodiments of the present disclosure includes that the seal system is an arch-bound seal.

A seal system for a gas turbine engine according to one disclosed non-limiting embodiment of the present disclosure includes a seal runner manufactured of a Titanium-Zirconium-Molybdenum (TZM) alloy material that provides a first coefficient of thermal expansion; and a seal ring manufactured of an electrographitic carbon material that provides a second coefficient of thermal expansion greater than the first coefficient of thermal expansion, wherein the seal ring is assembled to the seal runner to form a sealing interface that provides a clearance in both a hot operating condition and a cold operating condition.

A further embodiment of any of the foregoing embodiments of the present disclosure includes that the sealing interface defines a 200%-300% smaller effective sealing interface at the cold operating condition as compared to materials which have an equivalent tensile yield strength capability of 120,000-142,000 psi tensile yield strength.

A further embodiment of any of the foregoing embodiments of the present disclosure includes that the sealing interface at the hot operating condition is essentially zero.

A further embodiment of any of the foregoing embodiments of the present disclosure includes that the sealing interface at the hot operating condition is about 0.001 inches (0.0254 mm).

A further embodiment of any of the foregoing embodiments of the present disclosure includes that the seal system is an arch-bound seal.

A further embodiment of any of the foregoing embodiments of the present disclosure includes that the seal ring comprises a multiple of segments.

A further embodiment of any of the foregoing embodiments of the present disclosure includes that the seal runner provides an approximately 40,000-120,000 psi tensile yield strength, an elastic modulus of 49.1 lbf×10^6/in^2 and a CTE of 2.95 inE−6/in/° F.

A further embodiment of any of the foregoing embodiments of the present disclosure includes that the seal system is from 0.5 to 20 inches (12.7-508 mm) in diameter.

A further embodiment of any of the foregoing embodiments of the present disclosure includes that the seal system is operable at revolutions per minute of 0-50,000 RPM.

A further embodiment of any of the foregoing embodiments of the present disclosure includes that the seal system is operable at from −65° F. to 1200° F. (−54-2192° C.) and 2 psia to 400 psia (0.14-28 bar).

A further embodiment of any of the foregoing embodiments of the present disclosure includes that the hot operating condition is above 1000° F. (538° C.).

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
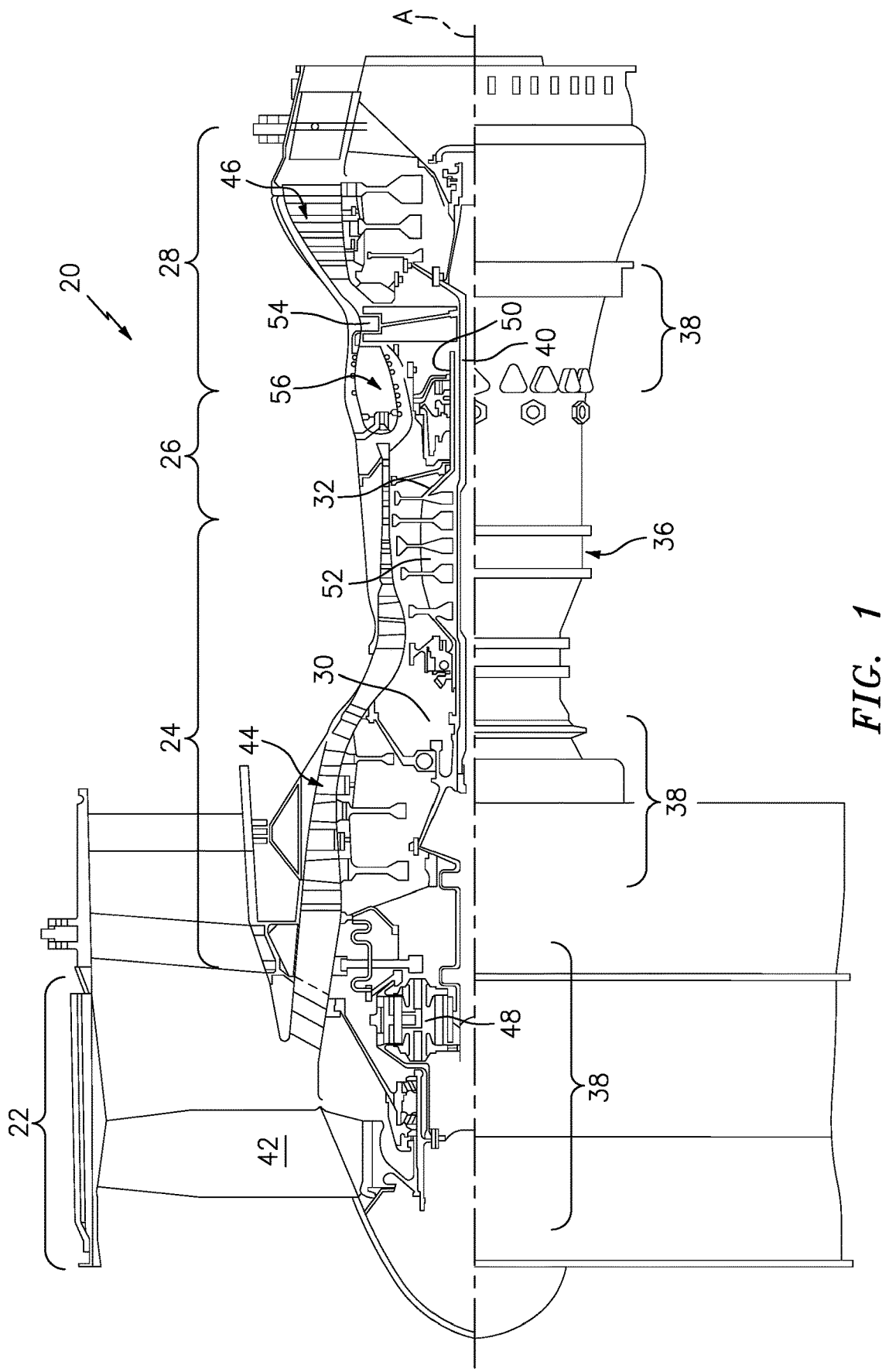
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing compartments 38. It should be understood that various bearing compartments 38 at various locations may alternatively or additionally be provided.

Figure 2:
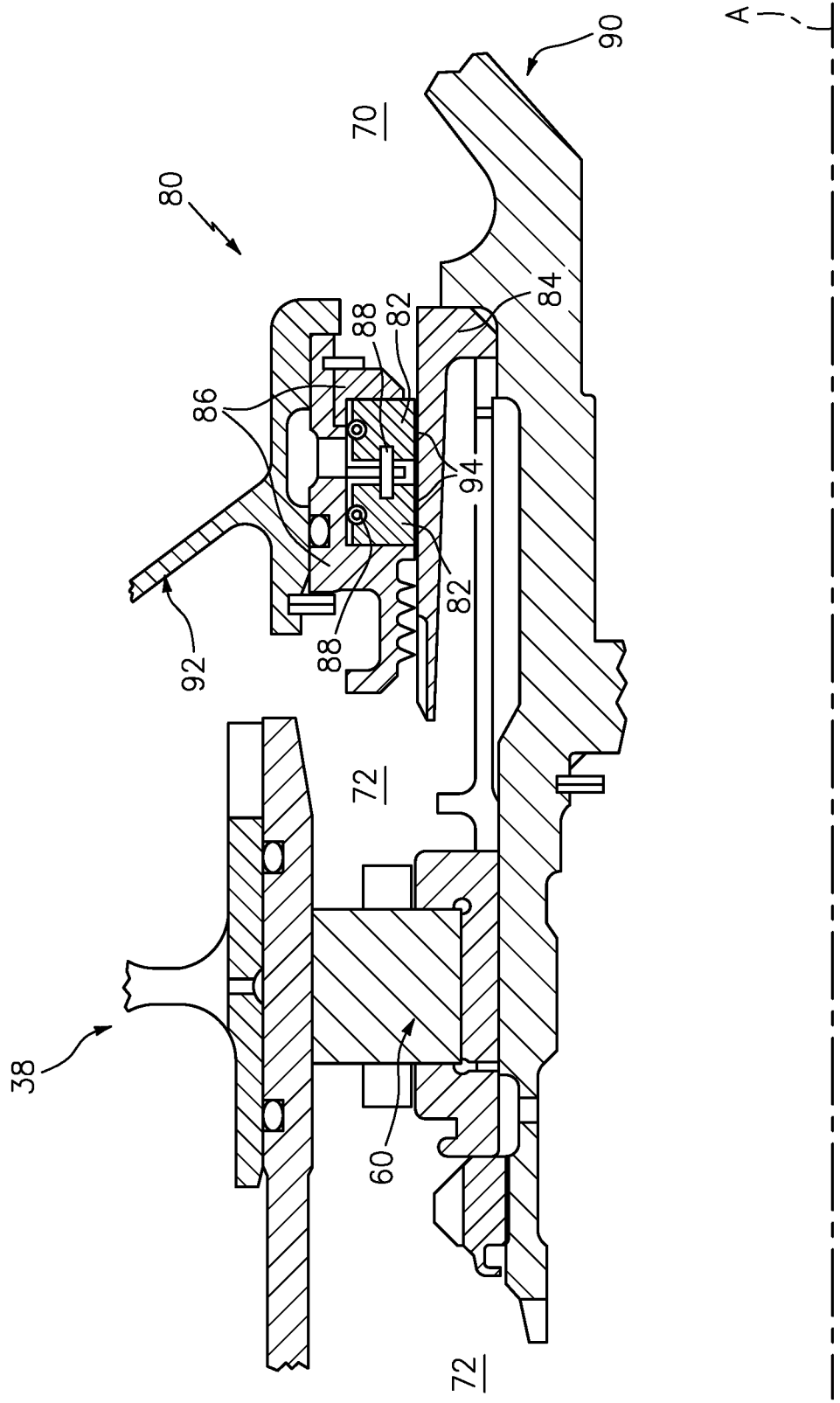
FIG. 2 is a longitudinal schematic sectional view of a bearing compartment with a seal system according to one disclosed non-limiting embodiment.

Each of a multiple of bearing compartments 38 include one or more bearings 60 (illustrated schematically; FIG. 2) and one or more seal system 80. The bearings 60 and seal system 80 respectively support and interface with the shafts 40, 50 of the respective low spool 30 and high spool 32.

The seal system 80 operates to seal a "wet" zone from a "dry" zone. In other words, regions or volumes that contain oil may be referred to as a "wet" zone and an oil-free region may be referred to as a "dry" zone. So, for example, the interior of each bearing compartment 38 may be referred to as a wet zone that ultimately communicates with an oil sump while the region external thereto may be referred to as a dry zone. That is, the bearings 60 support the low spool 30 and the high spool 32 and the seal system 80 separate the "wet" zone from the "dry" zone to define the boundaries of each bearing compartment 38. Although particular bearing compartments and bearing arrangements are illustrated in the disclosed non-limiting embodiment, other bearing compartments and bearing arrangements in other engine architectures such as three-spool architectures will also benefit herefrom.

With reference to FIG. 2, the seal system 80 generally includes a seal ring 82, a seal runner 84, and a seal housing 86. The seal ring 82 may include springs 88 or other features that position one or more ring segments of the seal ring 82. The seal housing 86 may include secondary seals such as knife seals.

The seal system 80, which provides relatively small clearance segmented circumferential, split ring, controlled gap, or radial clearance style seals are sometimes referred to as an arch bound seal. As used herein, "arch-bound" refers to the configuration of a series of segments of a ring in which the ends of the segments are held in mutual contact in a circumferential direction by a radially inwardly directed force such that the radius of the ring cannot be further decreased in a non-destructive manner. The radially inwardly directed force may be produced, for example, by a spring such as garter springs. Conventional seal systems utilize materials which have properties that may result in less favorable operating radial clearances which may also contain strength or structural limitations that are typically limited by the capabilities of their materials.

The seal system 80 may be utilized, for example, to cap the bearing compartment 38 for effective oil containment and preclude hot air ingestion. In one embodiment, the seal system 80 typical of gas turbine engine usages may be from 0.5 to 20 inches (12.7-508 mm) in diameter and operate at 0-50,000 revolutions per minute, and temperatures and pressures of −65° F. to 1200° F. (−54-2192° C.) and 2 psia to 400 psia (0.14-28 bar).

Figure 4:
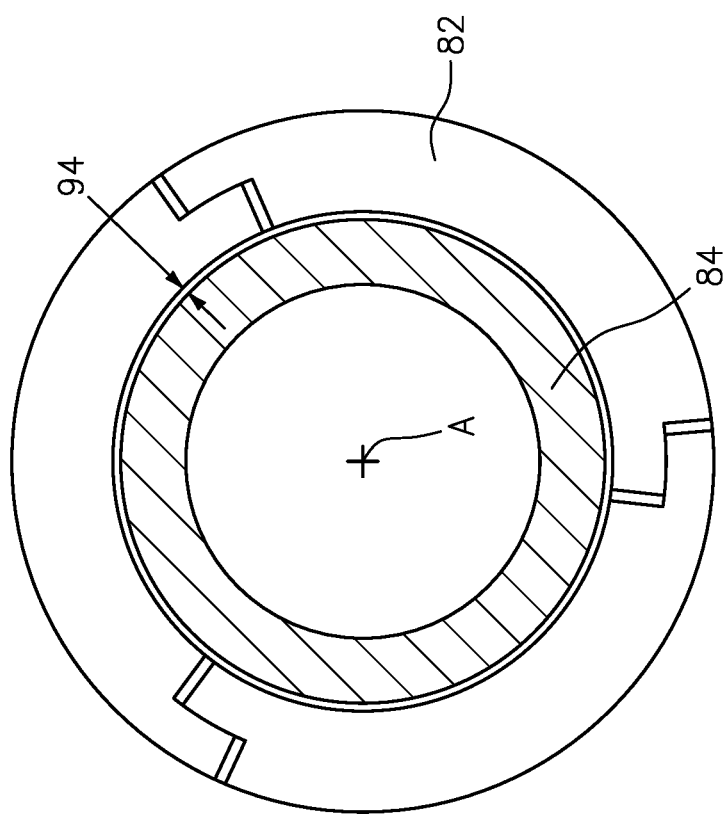
FIG. 4 is a schematic view of the seal system in an operational condition.
Figure 3:
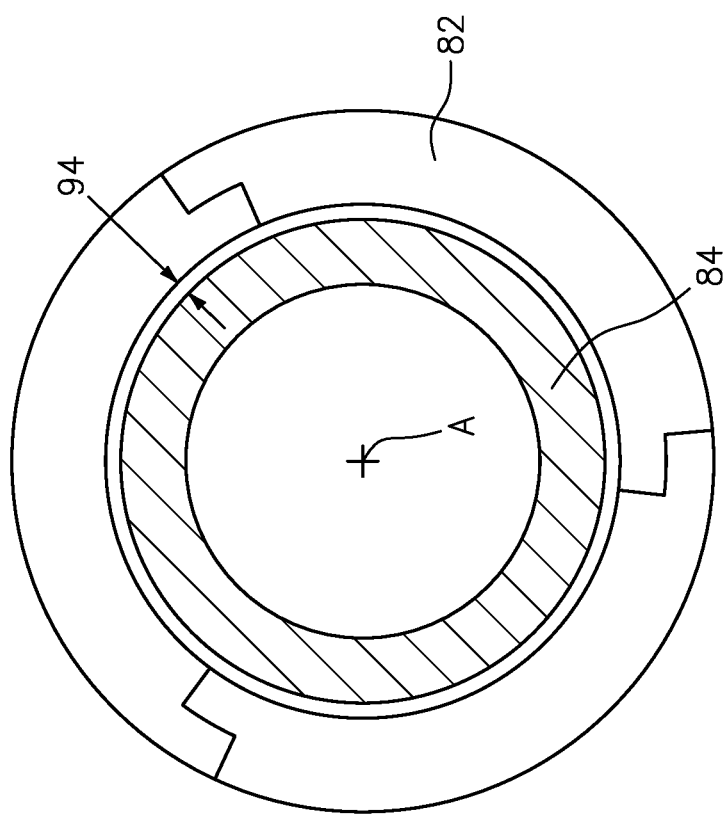
FIG. 3 is a schematic view of the seal system in a build condition.

The seal system 80 may be located between a rotational component 90 such as the shafts 40, 50 (FIG. 1) and a non-rotational structure such as support 92 to define a sealing interface 94 (also shown in FIG. 3 and FIG. 4). The seal ring 82 is a rotationally stationary component that mounts to the support 92 via the seal housing 86. The seal runner 84 is mounted to the rotational component 90 and interfaces with the seal ring 82 to form the sealing interface 94. The sealing interface 94 varies in response to operational conditions between a cold operating condition such as at build to low power operational condition (FIG. 3) and a hot operating condition such as cruise flight conditions (FIG. 4) during gas turbine engine operation.

The air side 70, or high pressure side, is here illustrated as to the right of the seal system 80. The bearing compartment 72 air/oil side is here illustrated to the left of the seal system 80 and may be considered the low pressure side. The seal system 80 provides a combination of materials to achieve the desired lower operational gap/air leakage/oil weepage at the sealing interface 94. Materials for the rotating runner contain structural limitations, e.g., strength, etc., when a low coefficient of expansion material, e.g., ceramic, etc. is used.

The seal ring 82, in the disclosed embodiment, is manufactured of a graphitic or electrographitic carbon based material. The seal ring 82 provides a higher coefficient of thermal expansion, relative to conventional materials, with a reduced heat generation design for reduced overall component temperature changes. The relatively higher coefficient of thermal expansion material of the seal ring 82 permits thermal growth at a higher rate to more closely match the total thermo-mechanical deformation of the seal runner 84. This facilities a lower effective radial effective sealing interface 94.

The seal runner 84, in the disclosed embodiment, is manufactured of a Molybdenum alloy such as Titanium-Zirconium-Molybdenum (TZM) alloys. The seal runner 84 provides a low coefficient of thermal expansion less than that of the seal ring 82, and a relatively high elastic modulus and high strength characteristic greater than that of conventional materials that also have low coefficients of expansion such as ceramics. In one example, the Titanium-Zirconium-Molybdenum (TZM) alloy seal runner 84 provide an approximately 40,000-120,000 psi tensile yield strength, elastic modulus of 49.1 lbf×10^6/in^2 and a CTE of 2.95 inE−6/in/°F.

The seal runner 84, using a Molybdenum alloy such as Titanium-Zirconium-Molybdenum (TZM), also contains a relatively higher minimum value for the range of yield strengths compared to that of conventional materials used with a low coefficient of expansion, e.g., ceramics. This higher value for the range of yield strength characteristic enable the TZM material to be used in more challenging structural applications. The combination of low coefficient of expansion, higher elastic modulus and higher strength of the seal runner 84, combined with the characteristics of the seal ring 82, provides for an optimized lower effective sealing interface 94 during build and operation, thus optimizing seal system performance and reliability.

The optimized effective sealing interface 94 of the Molybdenum alloy seal runner 84 and the graphitic seal ring 82 in the illustrative embodiment as compared to other conventional materials may be defined by a comparison factor of the effective sealing interface 94 at the cold or build/low power operating condition (FIG. 3) and a hot or normal operational condition (FIG. 4). The comparison factor may be defined by setting an equivalent effective sealing interface 94 at the hot operating condition to be essentially near zero, e.g., 0.001 inches (0.0254 mm). This results in the sealing interface 94 providing a clearance in both the hot operating condition and the cold operating condition. That is, a desired baseline hot operating condition provides minimal air leakage without operational interference to provide seal reliability and performance which then results in a cold operating condition sealing interface 94 that can be compared by the comparison factor.

For an equivalent hot operating condition (FIG. 4) sealing interface 94 of the Molybdenum alloy seal runner 84 and the graphitic seal ring 82 of the illustrative embodiment, the resultant cold operating condition (FIG. 3) sealing interface 94 provides a comparison factor that is approximately 200%-300% smaller than that of conventional alloys such as steel alloys, titanium alloys, nickel based alloys which have equivalent tensile yield strength capability of 120,000-142,000 psi tensile yield strength. Although some ceramic materials may have an equivalent or better effective sealing interface 94 at the cold operating condition, such ceramic materials provide unacceptable tensile yield strength capability for gas turbine operations as compared to the Molybdenum alloy seal runner 84 of the illustrative embodiment. The seal runner 84, using a Molybdenum alloy such as titanium-zirconium-Molybdenum (TZM), also typically provides a higher minimum value for the range of yield strengths as compared to that of conventional materials used with a relatively lower coefficient of expansion, e.g., ceramics which have a 8,700-76,000 psi tensile yield strength.

The seal system 80 provides essentially no limit to rotor speed, e.g., over 45,000 rpm; low to no oil cooling requirements at hot operating conditions, e.g., 1000° F. (538° C.); provides a torturous path for oil to egress; and maintains a healthy delta pressure at engine operating conditions.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal system for a gas turbine engine comprising:
   a seal runner manufactured of a Titanium-Zirconium-Molybdenum (TZM) alloy that provides a first coefficient of thermal expansion; and
   a seal ring manufactured of a graphitic material that provides a second coefficient of thermal expansion greater than the first coefficient of thermal expansion.

2. The system as recited in claim 1, wherein the seal ring is assembled to the seal runner to form a sealing interface that provides a clearance in both a hot operating condition and a cold operating condition.

3. The system as recited in claim 2, wherein the sealing interface defines a 200%-300% smaller effective sealing interface at the cold operating condition as compared to seal runner materials which have an equivalent tensile yield strength capability of 120,000-142,000 psi tensile yield strength.

4. The system as recited in claim 2, wherein the sealing interface at the hot operating condition is essentially zero.

5. The system as recited in claim 2, wherein the sealing interface at the hot operating condition is about 0.001 inches (0.0254 mm).

6. The system as recited in claim 1, wherein the seal system is an arch-bound seal.

7. A seal system for a gas turbine engine comprising:
   a seal runner manufactured of a Molybdenum alloy material that provides a first coefficient of thermal expansion,
   a seal ring manufactured of a graphitic material that provides a second coefficient of thermal expansion greater than the first coefficient of thermal expansion,
   wherein the seal ring is manufactured of electrographitic carbon materials.

8. The system as recited in claim 7, wherein the seal runner is manufactured of a Titanium-Zirconium-Molybdenum (TZM) alloy.

9. A seal system for a gas turbine engine comprising:
   a seal runner manufactured of a Titanium-Zirconium-Molybdenum (TZM) alloy material that provides a first coefficient of thermal expansion; and
   a seal ring manufactured of an electrographitic carbon material that provides a second coefficient of thermal expansion greater than the first coefficient of thermal expansion, wherein the seal ring is assembled to the seal runner to form a sealing interface that provides a clearance in both a hot operating condition and a cold operating condition.

10. The system as recited in claim 9, wherein the sealing interface defines a 200%-300% smaller effective sealing interface at the cold operating condition as compared to materials which have an equivalent tensile yield strength capability of 120,000-142,000 psi tensile yield strength.

11. The system as recited in claim 9, wherein the sealing interface at the hot operating condition is essentially zero.

12. The system as recited in claim 9, wherein the sealing interface at the hot operating condition is about 0.001 inches (0.0254 mm).

13. The system as recited in claim 9, wherein the seal system is an arch-bound seal.

14. The system as recited in claim 9, wherein the seal ring comprises a multiple of segments.

15. The system as recited in claim 9, wherein the seal runner provides an approximately 40,000-120,000 psi tensile yield strength, an elastic modulus of 49.1 lbfx10^6/in^2 and a CTE of 2.95 inE-6/in/° F.

16. The system as recited in claim 9, wherein the seal system is from 0.5 to 20 inches (12.7-508 mm) in diameter.

17. The system as recited in claim 9, wherein the seal system is operable at revolutions per minute of 0-50,000 RPM.

18. The system as recited in claim 9, wherein the seal system is operable at from −65F to 1200F (−54–2192 C) and 2 psia to 400 psia (0.14-28 bar).

19. The system as recited in claim 18, wherein the hot operating condition is above 1000F (538C).

* * * * *